United States Patent Office 3,149,147
Patented Sept. 15, 1964

3,149,147
NOVEL SUBSTITUTED PHENYLALKYLAMINES
Elvin L. Anderson, Moorestown, N.J., and Maxwell Gordon, Elkins Park, Pa., assignors to Smith Kline & French Laboratories, Philadelphia, Pa., a corporation of Pennsylvania
No Drawing. Filed Mar. 16, 1961, Ser. No. 96,032
4 Claims. (Cl. 260—465)

This invention relates to novel substituted phenylalkylamines having useful pharmacodynamic properties. More specifically, this invention relates to cyano substituted phenylalkylamines having an orectic and diuretic activity.

The novel compounds of this invention are represented by the following general formula:

FORMULA I

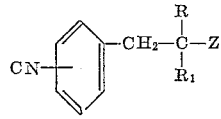

in which:
R and $R_1$ represent hydrogen or methyl; and
Z represents amino, monomethylamino, dimethylamino, carbobenzoxyamino, carbethoxyamino, formylamino, acetamino or β-hydroxyethylamino.

Advantageous compounds of this invention are represented by the above Formula I when the cyano substituent is in a position on the benzene ring which is para to the alkylamino chain; R represents hydrogen; and $R_1$ represents methyl.

A preferred compound of this invention is 2-(p-cyanophenyl)-isopropylamine.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in an aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, cyclohexyl sulfamic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The novel cyano substituted phenylalkylamines of this invention are prepared according to the following general procedure illustrated by way of example for the p-cyano derivative:

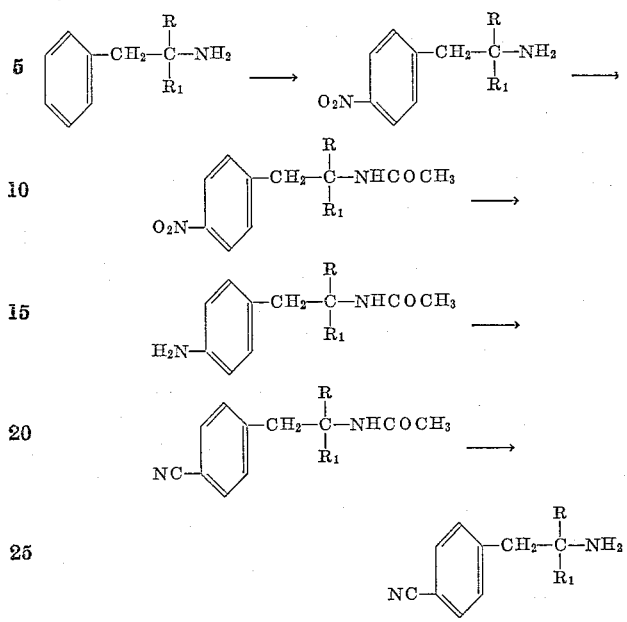

Thus, the phenylalkylamine is nitrated with a mixture of nitric and sulfuric acids at a temperature of from 0–5° C. The nitration product is acetylated and the derivative obtained is reduced with a platinum catalyst, preferably platinum oxide, to give the amino derivative. The latter compound is then converted to the cyano derivative via a Sandmeyer reaction (nitrous acid/cuprous cyanide) and the product is obtained by final hydrolysis of the acetyl group with approximately 10% hydrochloric acid solution.

The corresponding ortho isomers are obtained by fractional separation of the nitrated amine hydrochlorides. The resulting free bases are then reacted further as shown above to give the cyano products.

The compounds of Formula I above where Z represents dimethylamino, carbobenzoxyamino, carbethoxyamino or formylamino are prepared readily from the corresponding primary amines (Z is amino). The dimethylamino derivatives are obtained by methylation of the primary amine with a mixture of aqueous formaldehyde and formic acid. The carbobenzoxyamino and carbethoxyamino derivatives are prepared from the primary amine by reaction with benzyl chloroformate and ethyl chloroformate, respectively, at 0° C. in the presence of sodium hydroxide. The formylamino derivatives are prepared from the primary amine by refluxing with ethyl formate for from 12–24 hours.

The monomethylamino derivatives are prepared as follows. The corresponding formylamino compound obtained as above is reacted with sodium amide or a suspension of sodium hydroxide or hydride in mineral oil to give the sodio derivative which is alkylated with methyl iodide to give the N-methyl-N-formylamine. This compound is then hydrolyzed in hydrochloric acid solution to give the monomethylamine.

Alternatively the mono- and dimethylamino compounds of Formula I are obtained by using corresponding mono- and dimethylamino starting materials in the above outlined reaction sequence. Use of these starting materials eliminates the acetylation step.

The β-hydroxyethylamino derivatives of Formula I are prepared by alkylation of the corresponding primary amine with one equivalent of either ethylene halohydrin, preferably bromohydrin, or ethylene oxide. An acid binding agent is advantageously employed with the halohydrin which may be either an excess of the primary amine or an alkali metal carbonate, preferably potassium carbonate.

It will be readily apparent to one skilled in the art that certain of the compounds of this invention, notably those in which R is hydrogen and $R_1$ is methyl so that an asymmetric carbon atom is formed may be present as optical isomers. The connotation of the general formulas presented herein is to include all isomers, particularly the separated d or l optical isomers as well as the dl mixture of these isomers. If desired, the isomers may be separated for individual use by separation methods known to the art, such as fractional crystallization, for instance, of the d-tartrate salts of the cyano substituted phenylisopropylamines.

The following examples illustrate the compounds of this invention and their preparative procedures but are not intended to limit the scope as set forth in Formula I.

*Example 1*

To 600 ml. of concentrated sulfuric acid is added dropwise with stirring, 4.30 g. of 2-phenylisopropylamine. The reaction is cooled in an ice-salt bath to maintain a temperature between 0 and 20° C. When the addition is complete, the mixture is cooled to 0° C. and the addition of 150 ml. of fuming nitric acid is commenced. After two-thirds of the acid has been added, it is necessary to add an additional 200 ml. of concentrated sulfuric acid to the reaction mixture to maintain fluidity. During the addition of fuming nitric acid, the reaction mixture is kept at a temperature of 5–10° C. After the addition is complete, the mixture is stirred for one hour at 0–5° C. It is then poured onto cracked ice and made basic with 40% sodium hydroxide solution. The oil is extracted into benzene and the combined extract washed with water. The dried benzene solution is evaporated to give 2-(p-nitrophenyl)-isopropylamine.

To two liters of dry ether is added 517.5 g. of 2-(p-nitrophenyl)-isopropylamine. The solution is cooled in an ice-salt bath and 333 ml. of acetic anhydride is added slowly with stirring. Crystallization becomes pronounced after the addition of 75 ml. of anhydride. When the addition is half complete, it is necessary to add an additional liter of ether and maintain stirring. After the addition is complete, the mixture is stirred at 10° C. for one hour and fifteen minutes. It is then filtered and washed thoroughly with ether to give 2-acetamino-1-(p-nitrophenyl)-propane which is purified by dissolving in a minimum of hot benzene, cooling and adding ether, M.P. 93–94.5° C.

22.2 g. of 2-acetamino-1-(p-nitrophenyl)-propane is dissolved in approximately 150 ml. of ethanol. Several hundred mg. of platinum oxide catalyst is added and the compound reduced under fifty pounds of hydrogen. About one hour is required to give the theoretical uptake of hydrogen. The catalyst is filtered off, and the filtrate concentrated to syrup under vacuum and treated with two volumes of ether and a small amount of hexane. The solution is allowed to crystallize to yield 2-acetamino-1-(p-aminophenyl)-propane, M.P. 109.5–111° C.

To 26 g. of 2-acetamino-1-(p-aminophenyl)-propane is added a mixture of 8.5 ml. of concentrated sulfuric acid and 100 g. of ice. Solution is effected by warming on a steam bath. After cooling to 0° C., a solution of 9.5 g. of sodium nitrite in 35 ml. of water is added dropwise, the temperature being kept below 5° C. during the addition. After the addition is complete, the solution is neutralized with 17 g. of dry sodium carbonate, the temperature being kept below 5° C. The neutral diazonium solution is poured into a cuprous cyanide mixture at 0° C. with stirring. The cyanide mixture is prepared by mixing 26.8 g. of dry cuprous cyanide and 29.2 g. (0.596 eq.) of sodium cyanide, adding 115 ml. of water, and then adding 140 ml. of toluene after solution takes place. After stirring this Sandmeyer reaction mixture at 0° C. for one hour, it is allowed to come to room temperature overnight. After standing overnight, three layers are present, a toluene layer, an aqueous layer and a resinous layer. The three layers are separated. The water is extracted twice with boiling toluene, and the resinous layer is extracted four times with boiling toluene. All the toluene fractions are combined and dried over magnesium sulfate. The toluene solution is then concentrated in vacuum. Crystallization begins while the solution is still hot. The crystallizing mixture is placed in a refrigerator for one hour and then filtered and washed with carbon tetrachloride to give 2-acetamino-1-(p-cyanophenyl)-propane, M.P. 116–118.5° C.

Ten and one-half grams of 2-acetamino-1-(p-cyanophenyl)-propane is taken up in 250 ml. of 10% hydrochloric acid and refluxed for three and one-quarter hours. At the end of this time, the solution is made basic with 40% sodium hydroxide solution and extracted with chloroform. The combined chloroform extracts are washed once with water, then extracted with 10% acetic acid. The acetic acid extracts are combined and made basic with 40% sodium hydroxide solution. The basic aqueous solution is then extracted with chloroform. The chloroform solution is washed once with water, dried and concentrated in vacuo to give 2-(p-cyanophenyl)-isopropylamine.

The free base is dissolved in a small amount of ethanol and hydrogen chloride/isopropanol is added. The volume is doubled by adding an equal volume of ether. The hydrochloride salt crystallizes which after recrystallization from absolute ethanol melts at 205–206.5° C.

Another sample of the free base is dissolved in ethyl acetate and an ethyl acetate solution of maleic acid is added to give the corresponding maleate salt.

*Example 2*

Following the general procedures of Example 1, equivalent amounts of 2-phenethylamine or 2-benzyl-2-aminopropane are similarly nitrated, acetylated, reduced, diazotized and finally hydrolyzed to give the corresponding 2-(p-cyanophenyl)-ethylamine or 2-(p-cyanobenzyl)-2-aminopropane.

*Example 3*

A 40% aqueous solution of formaldehyde (5.1 g.) is added to a cooled solution of 3.3 g. of 2-(p-cyanophenyl)-isopropylamine (prepared as in Example 1) in 6.6 g. of 90% formic acid and the mixture refluxed for 18 hours. The cooled reaction mixture is treated with 2.7 ml. of concentrated hydrochloric acid and then evaporated in vacuo. The residue is made alkaline with 50% potassium hydroxide solution and extracted with ether. Evaporation of the dried ether extract yields 2-(p-cyanophenyl)-N,N-dimethylisopropylamine.

*Example 4*

A stirred mixture of 6.0 g. of sodium hydroxide, 21.9 g. of 2-(p-cyanophenyl)-ethylamine (prepared as in Examples 1 and 2) and 50 ml. of water is cooled to 0° C. and 16.5 g. of ethyl chloroformate is added dropwise at a rate to maintain the temperature below 20° C. After the addition is complete, the reaction mixture is stirred for 30 minutes at 0° C., extracted with ether and the dried extract is concentrated to give 2-(p-cyanophenyl)-N-carbethoxyethylamine.

Example 5

A stirred mixture of 6.0 g. of sodium hydroxide, 24.0 g. of 2-(p-cyanophenyl)-isopropylamine (prepared as in Example 1) and 50 ml. of water is cooled to 0° C. and 26.0 g. of benzyl chloroformate is added dropwise, maintaining the temperature below 20° C. When the addition is complete, stirring is continued for 30 minutes at 0° C. The reaction mixture is extracted with ether and the dried extract concentrated to give 2-(p-cyanophenyl)-N-carbobenzoxyisopropylamine.

Example 6

A solution of 8.0 g. of 2-(p-cyanophenyl)-isopropylamine (prepared as in Example 1) and 65 ml. of ethyl formate is refluxed for 18 hours. The excess formate is evaporated in vacuo to give 2-(p-cyanophenyl)-N-formylisopropylamine.

Example 7

To a solution of 17.4 g. of 2-(p-cyanobenzyl)-2-aminopropane in 100 ml. of methanol is added a solution of 4.4 g. of ethylene oxide in 50 ml. of methanol. After standing at 25° C. for 16 hours, the solution is refluxed for two hours. The solvent is evaporated and the residual oil is fractionally distilled to give 2-(p-cyanobenzyl)-2-(β-hydroxyethylamino)-propane, which is readily converted to the hydrobromide salt.

Example 8

Following the general procedures outlined in Example 1, an equivalent amount of 2-phenyl-N-methylisopropylamine is nitrated, reduced and diazotized to give the corresponding 2-(p-cyanophenyl)-N-methylisopropylamine.

What is claimed is:
1. Chemical compounds selected from the group consisting of a free base having the formula:

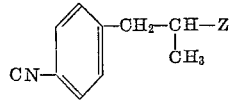

in which Z is a member selected from the group consisting of amino, monomethylamino, dimethylamino, carbobenzoxyamino, carbethoxyamino, formylamino, acetamino and β-hydroxyethylamino, and its salts of non-toxic pharmaceutically acceptable acids.

2. A chemical compound having the formula:

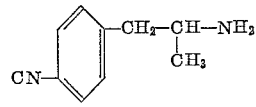

3. 2-(p-cyanophenyl)-isopropylamine hydrochloride.
4. 2-(p-cyanophenyl)-N-methylisopropylamine.

References Cited in the file of this patent

Chiaverelli et al.: Gazzetta Chimica Italiana, 1951, vol. 81, pages 89–97.

Bunnett et al.: Journal of Organic Chemistry, 1952, volume 17, pages 482–4.

Shapiro et al.: Journal of American Chemical Society, 1958, vol. 80, pages 6065–6071.

Stewart et al.: "Journal of Organic Chemistry," vol. 25, pages 913–917 (1960).